United States Patent [19]
Desai et al.

[11] Patent Number: 6,072,904
[45] Date of Patent: Jun. 6, 2000

[54] FAST IMAGE RETRIEVAL USING MULTI-SCALE EDGE REPRESENTATION OF IMAGES

[75] Inventors: Ranjit Desai, Framingham, Mass.; Mohamed Abdel-Mottaleb, Ossining, N.Y.

[73] Assignee: Philips Electronics North America Corp., New York, N.Y.

[21] Appl. No.: 09/002,097

[22] Filed: Dec. 31, 1997

[51] Int. Cl.$^7$ .............................. G06K 9/54; G06K 9/62; H04N 1/00
[52] U.S. Cl. ......................... 382/225; 382/224; 382/305; 382/168; 358/403; 707/2; 707/3; 707/102; 707/104
[58] Field of Search .................................... 382/141, 168, 382/203, 204, 224, 225, 217, 279, 305; 358/403, 404; 707/1, 3, 102, 103, 104

[56] References Cited

U.S. PATENT DOCUMENTS

| | | | |
|---|---|---|---|
| 5,519,789 | 5/1996 | Etoh | 382/225 |
| 5,631,971 | 5/1997 | Sparrow | 382/125 |
| 5,644,765 | 7/1997 | Shimura et al. | 382/305 |
| 5,802,361 | 9/1998 | Wang et al. | 382/217 |
| 5,805,746 | 9/1998 | Miyatake et al. | 382/305 |
| 5,819,288 | 10/1998 | De Bonet | 707/104 |
| 5,852,823 | 12/1998 | De Bonet | 382/279 |
| 5,893,095 | 4/1999 | Jain et al. | 382/141 |
| 5,899,999 | 5/1999 | De Bonet | 382/167 |

OTHER PUBLICATIONS

Remias, et al "Block–Oriented image decomposition and retrieval in image database systems," IEEE, pp. 85–92, 1996.

Eakins "Retrieval of trade–mark images by shape feature—The Artisan Project," Institution of Elect. Engineers, pp. 1–6, 1996.

Shiotani et al, "Image retrieval System Using an Iconic Thesaurus," IEEE, pp. 44–48, Apr. 1997.

Liu Sheng, et al "Patient image Retrieval: An object–oriented Coupled Knowledge–Base/Database Approach," IEEE, pp. 89–100, 1992.

Yihong, et al "An image database system with fast image indexings Capability Based on Color Histograms, " pp. 407–411, IEEE, 1994.

Del–Bimbo, et al "Effective image Retrieval Using Deformable Templates," IEEE, pp. 120–124, 1996.

Androutsos, et al "Directional Detail Histogram for content Based image retrieval," IEEE, pp. 225–228, Jun. 1997.

Androutsos, et al "Efficient image Database Filtering Using Colour Vector Techniques," IEEE, 827–830, Jun. 1997.

W. Frei and C.C. Chen, "Fast Boundary Detection: A Generalization and a New Algorithm", IEEE Trans. Computers, vol. C–26, No. 10, pp. 988–998, 1997.

M. Abdel–Mottaleb et al., "Conivas: Content–Based Image and Video Access System", ACM Multimedia96, Boston, 1996.

M. Flicker et al., "Query by Image and Video Contrast: The QBIC System", IEEE Computer, 28(9), pp. 23–32, Sep. 1996.

(List continued on next page.)

Primary Examiner—Phuoc Tran
Assistant Examiner—Daniel G. Mariam
Attorney, Agent, or Firm—Gregory L. Thorne

[57] ABSTRACT

An image retrieval system for retrieving images from a data base in dependence upon the degree of correspondence with a user-input target image. The target image and each image in the data base are characterized by a vector of edge characteristics within each image. Retrieval is effected by a comparison of the characteristic vectors, rather than a comparison of the images themselves. To optimize performance, a set of characteristic vectors, at different levels of abstraction of the image, are associated with each data base image; images which are similar to the target image, at any level of abstraction, are retrieved. To further optimize the speed of search, the data base is partitioned into clusters, and the search is limited to the cluster most similar to the target image.

27 Claims, 3 Drawing Sheets

OTHER PUBLICATIONS

K. Hirata et al., "Query by Visual Example", Advances in Database Technology EDBT 1992, Third International Conference on Extending Database Technology, Viena, Austria, Springer–Verlag, 1992.

J. Canny, "A Computational Approach to Edge Detection", IEEE Trans. On Patern Analysis and Machine Intelligence, vol. 8, No. 6, pp. 679–698, Nov. 1986.

Toshikazu Kato et al.; "A sketch Retrieval Method for Full Color Image Database"—Query by Visual Example–; Electrotechnical Laboratory, MITI, Tsukuba 305, Japan; Abstract.

Anil K. Jain and Aditya Vailaya; "Image Retrieval Using Color and Shape"; Department of Computer Science, Michigan State University; Nov. 1995; Abstract.

FAST IMAGE RETRIEVAL USING MULTI-SCALE EDGE REPRESENTATION OF IMAGES

BACKGROUND OF THE INVENTION

1. Field of the Invention

Disclosed herein is a method and apparatus for image retrieval which uses a multi-scale edge representation of images. Through the use of this invention, images such as digitally encoded photographs, CAD design drawings, and video scenes, can be categorized for fast retrieval. The retrieval is effected by providing a sketch or image having characteristic edges; images are retrieved and presented in the order of their similarity to the provided sketch or image. This invention is particularly applicable to image retrieval from large image databases, such as photographic archives, digital libraries, catalogs, and videos.

2. Description of Related Art

Various techniques are commonly employed for retrieving images stored in a database. The most conventional technique for storing and retrieving images which match a desired characteristic is to associated key words with each images, such as "portrait", "seascape", "mountain", "presidents", etc. Having associated such key words to the images, a user provides one or more search words to the search or retrieval system, and the system presents one or more images in dependence upon the degree of correspondence between the search words and stored key words. Conventional Internet search engines are examples of such text based retrieval means.

Graphics based retrieval is a more intuitive approach to image retrieval. Conventional graphic based retrieval systems employ various forms of color or pattern matching. Typically, the user provides a sample image, and the system retrieves images having similar patterns of color. For example, by providing an image of a seascape, the retrieved images would be those with blue or green colors at their bottom, beige or brown colors in the middle, and blue/white colors at the top. Conventional pattern matching techniques may also be utilized. For example, images may be categorized as containing recognizable patterns, such as a mix of upright triangles for mountain scenes, circles and rectangles for body shapes, etc. A target image of a circle amongst triangles would retrieve, for example, a photograph of a person's head with mountains in the background; four circles in a rectangle might retrieve a photograph of Mount Rushmore; etc.

Formal algorithmic approaches are also utilized. In [1], the user provides a sketch, a drawing, or a detailed image, and the image retrieval is accomplished by comparing the sketch to each image in the database, at an abstract level. Associated with each data base image is an icon, which is a graphical abstraction of the actual image. A target icon is formed from the graphical abstraction of the user provided target image. Each data base image icon is compared to the target image icon by computing the degree of local and global correlation between the icons; the images associated with the icons having the strongest correlation are presented to the user.

These existing image retrieval methods require a significant amount of analysis and computation during the retrieval process, making image retrieval by graphic example significantly less efficient than text based retrieval techniques. Text based image retrieval, however, requires the categorizing of each picture by keywords, which can be a burdensome process if applied to hundreds or thousands of images; also, the individual choice of keywords limits the effectiveness of the search to the degree of correspondence between the words the categorizer used to describe the stored images, and the words the searcher uses to describe the desired image. Pattern based systems require the predefinition of characteristic patterns, and the search efficiency and effectiveness is directly related to the diversity of these characteristic patterns among the images in the database.

SUMMARY OF THE INVENTION

It is an object of this invention to provide a graphic based image retrieval system which is efficient, and which does not require manual effort to categorize the images in the database.

It is a further object of this invention to provide a categorization method which may be employed regardless of the content of the images in the database.

It is a further object of this invention to provide an image retrieval system which allows for minimal user input to effect a search.

In accordance with this invention, the images are stored in the database with an associated characterization of their edge content. Images having similar characterizations are grouped into clusters. The user enters a target image, in sketch or detail form; the retrieval system characterizes the edge content of the target image, using the same techniques employed to characterized the images in the database. The clusters having similar characterizations as the target characterization are identified, and the characterizations of the images within these clusters are compared to the target characterization. The images having the strongest similarity of characterization to the target characterization are presented for display. By employing the characterization technique, the comparison of the target to each image is rapidly performed; by employing the hierarchical clustering, the number of comparisons are reduced, and the order of comparisons can be reduced.

To enhance the ability of the system to locate similar, albeit not identical, images, a multi-scale representation is utilized. In accordance with this invention, each image is characterized at several levels of detail, and the characterizations at each of the detail levels are associated with the image. In this manner, images which are grossly similar to the target, at any of these levels of detail, will be identified for presentation, as well as those which are strongly similar to the target.

DESCRIPTION OF THE PREFERRED EMBODIMENTS

Figure 1:
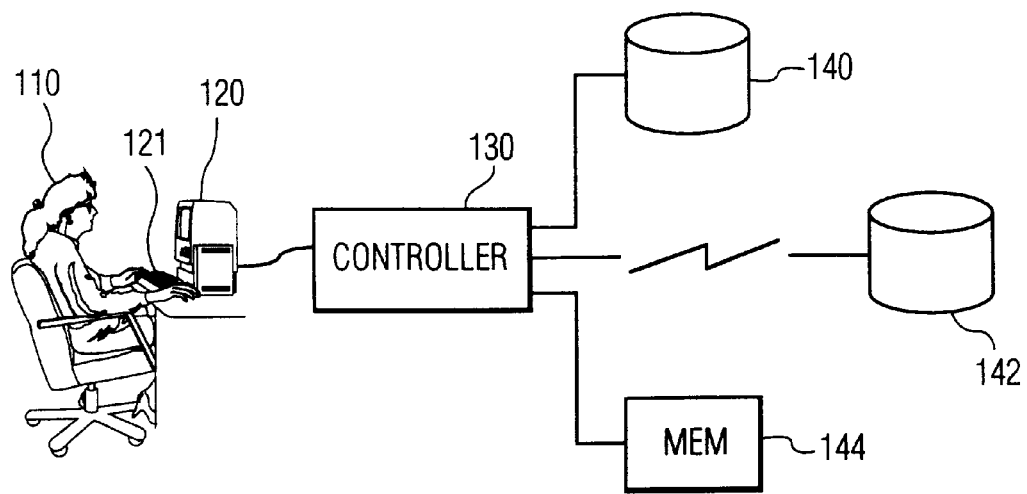
FIG. 1 shows an image retrieval system.

FIG. 1 shows an image retrieval system. A user 110 provides a graphic representation of a target image to the controller 130, using a graphic input device 121. The graphic input device 121 may be an image scanner, a digitizer, a camera, and the like. It may also be a conventional mouse or keyboard, which when used in conjunction with the graphic display 120, can be used to select or create target images. For example, a mouse and display can be utilized to create a sketch of an image using commonly available computer drawing packages. The mouse or keyboard can be utilized to select from stored images. The scanner is utilized to provide a copy of a photograph or drawing. The user can modify the input images as well, to refine or modify the target image.

The controller 130 is connected to a data base of images which may be located in a local disk storage 140, a remote disk storage 142, a memory device 144, and the like. The images will have been created and stored using input devices such as scanners, digitizers, and cameras, as discussed above. Additionally, they could be a series of related images as might be found in an MPEG encoded video, or a conventional video cassette tape. The term data base is used herein to mean a collection of items (images), each of which can be uniquely identified, typically by an address or index to their location within the system. For example, an image on a remote disk may be addressed by the disk's designation followed by a file name; an image on a cassette tape may be addressed by the cassette's title, followed by an index identifying where on the tape the image, or frame, is located. As is known in the art, a database may be distributed, and need not reside in a single physical device, nor need the addressing scheme be common among all devices. That is, as used herein, the image database is independent of the physical media which contains the images, and independent of the media dependent techniques for accessing each image.

In accordance with this invention, each image within the database will be characterized, based upon the pattern of edges contained in the image. Any number of techniques are available for the detection of edges within an image. In the preferred embodiment, the edges are determined by applying the techniques of Frei and Chen [1] to the image to determine the occurrence of detectable edges. Each edge is characterized as being either vertical, horizontal, left-diagonal, or right-diagonal. To minimize noise effects, only those edge points which form three successive points in the same direction are utilized; different levels of filtering may be obtained by requiring more or fewer successive points. Thus, each point, or picture element (pixel), in the image is identified as being on an edge or not, and if on an edge, which of four directions the edge is oriented. Other means of characterizing each pixel in an image with regard to the edges in the image are well known to those skilled in the art.

To characterize the image, based upon the characterization of each pixel within the image, a block histogram technique is employed. The image is decomposed, or partitioned, into separate blocks. In the preferred embodiment, each image is decomposed into a 16 by 16 grid of blocks (256 grid blocks); if the images are primarily rectangular, an asymmetric grid structure may be utilized. For each of the M blocks (M=256 in the preferred embodiment), a histogram of the characteristics of the pixels within the block is computed. The histogram will comprise, in the preferred embodiment, the number of pixels within the block which are on a horizontal edge, a vertical edge, and each of the two diagonal edges. If an alternative pixel characterization is employed, as discussed above, the histogram will contain the number of pixels conforming to each of the pixel characterization categories. Each histogram is normalized with respect to the total number of edges in the blocks.

Thus, in accordance with this invention, each image will be characterized by M normalized histograms of N edge types; in the preferred embodiment, each image is characterized by a 256(M)×4(N) vector. That is, as compared to the characterization of an image by another image, as is done in conventional systems, the image is characterized by a vector, or matrix, which represents a characterization of the edges, rather than the edges themselves. As would be apparent to one skilled in the art, different images may have similar edge characteristics even though they do not have similar edges; this invention is premised on the assumption that the advantages gained by the increased speed of retrieval outweigh the disadvantages caused by a potentially erroneous retrieval.

To assure the matching of images which conform to the general characteristics of the target image, albeit with detail differences, each image is characterized by the histogram method described above at three levels of detail, or resolution. A number of techniques are known in the art for representing an image at varying levels of detail. For example, on the Internet, images are often transmitted with minimal detail (obscured edges, etc.), then further refined by successive transmissions. In the preferred embodiment, successively blurred images of the original image are obtained by convolution with Gaussian kernels of successive widths. The original image is equivalent to a convolution with a Gaussian kernel of zero (0). In the preferred embodiment, Gaussian kernel widths of 5 and 7 are used to obtain two successively blurred representations of the original image. Other techniques may be employed to obtain blurred representations of the image, and more or less than two blurred representations may be utilized. Each of the blurred representations are subsequently characterized by block histograms, as discussed above.

In accordance with this invention, each image is represented by an N by N edge characterization at L levels of detail. In the preferred embodiment, each of the images is represented by block histogram vectors of size 256 by 4 (16×16) blocks, 4 edge characterizations) at levels of detail produced by the convolution of the image at each of 3 Gaussian widths (0,5,7).

To arrange these histogram representations of each image into an efficient partitioning for searching, the images are grouped into clusters. The clusters comprise those images having similar histogram characteristics. This clustering is effected at each level of detail, each level of detail having independent clusterings. Any number of clustering techniques may be employed; in the preferred embodiment, the entire database of images at each level of detail are partitioned using K-means clustering. In the preferred embodiment, K, the number of clusters, is equal to 8. By partitioning the entire data base into K-clusters in this way, the partitioning will automatically compensate for varying levels of diversity of images within different databases. For example, in the preferred embodiment, if the database comprises an assortment of portraits, landscapes, buildings, group photos, etc., all of the portraits may be expected to be partitioned into one or two clusters. Conversely, if the database is exclusively portraits, the clusters will be formed so as to distinguish among 8 different characterizations of portraits. Such clustering techniques are known in the art. More or fewer than 8 cluster partitions may be utilized; increased partitions will speed the search process but will limit the breadth of the search, perhaps missing images the searcher would have considered similar. Decreased partitions will slow the search process but increase the breadth of the search, decreasing the likelihood of omitting images similar to the search image.

Thus, in accordance with this invention, the database is partitioned into K clusters of images at each of L levels of detail, based upon an M by N histogram vector characterization of each of the images at each of the L levels of detail. In the preferred embodiment, K=8, L=3, M=256, and N=4.

Figure 2:
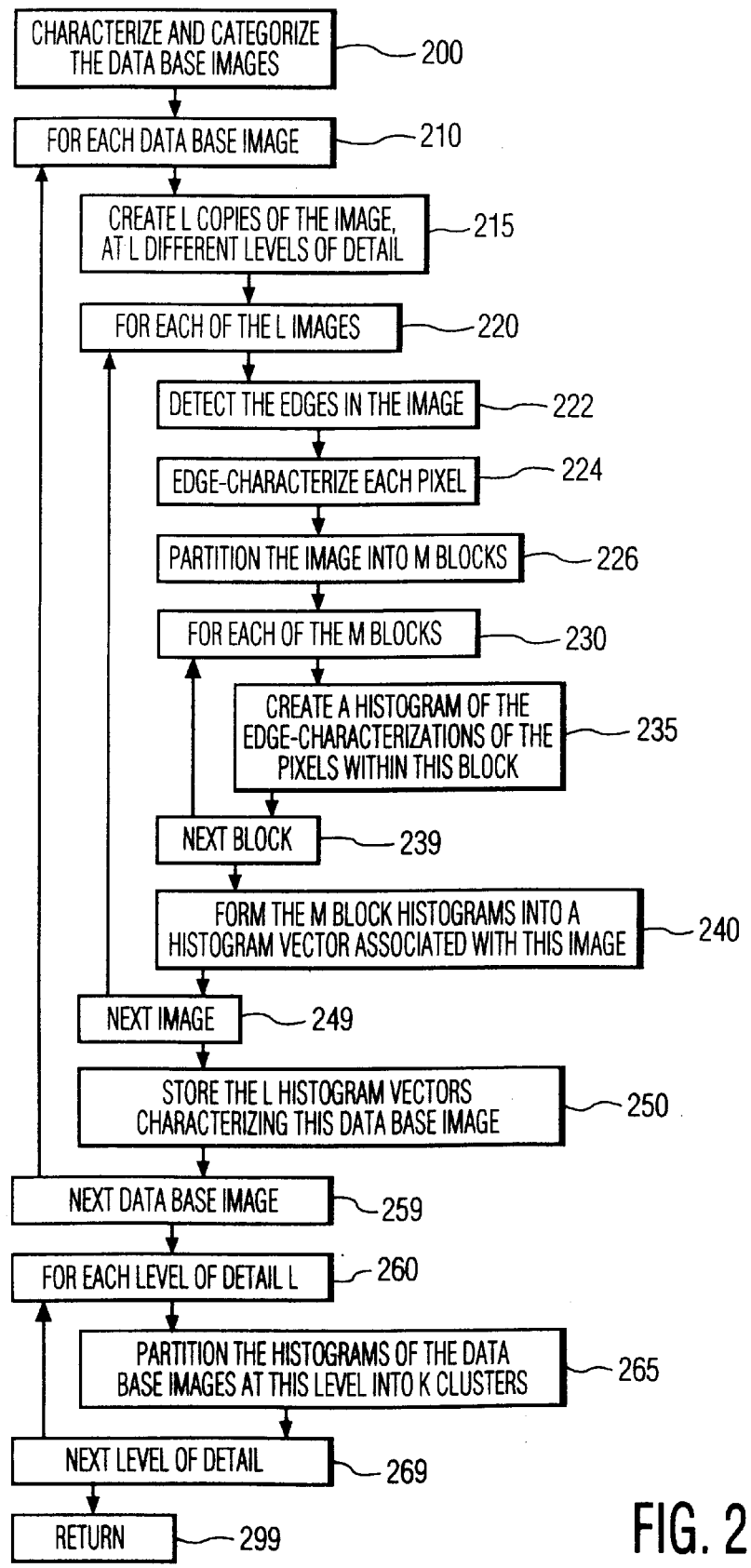
FIG. 2 shows a flowchart for the creation of the image retrieval data base in accordance with this invention.

FIG. 2 shows a flowchart for characterizing the images of a database in accordance with this invention. The process for characterizing and categorizing the data base images starts at 200. Each data base image is processed in the loop from 210 through 259. At 215, the data base image is convoluted so as to form L images, each at a different level of detail. Each of the L images are processed in the loop from 220 through 249. The edges within the convoluted image are detected, at 222, and the pixels within the convoluted image are characterized in dependence upon the detected edges, at 224. The image is partitioned into M blocks, at 226, and each block is processed in the loop from 230 through 239. In this loop, at 235, the edge-characterization of the pixels within the block are summarized and normalized into a histogram associated with the block. The M block histograms form a histogram vector associated with the convoluted image, at 240. The L histogram vectors associated with the data base image are stored, at 250.

After all data base images are processed as to provide histogram vectors at L levels of detail, the data base is partitioned into clusters for each level of detail, in the loop from 260 through 269. At 265, the data base images at each level of detail are partitioned into K clusters. Having characterized each data base image into L histogram vectors of M blocks of N edge-characterizations, and subsequently categorizing the histogram vectors into K clusters at each of the L levels of detail, the process terminates, at 299.

The retrieval of images from the data base, based upon the above categorization and characterization of the images, is discussed below. As previously noted, the choice of K, L, M and N are unconstrained, each choice however having an effect on the efficiency and effectiveness of the matching process, as would be evident to one skilled in the art. Similarly, the specific processes employed to characterize the edges, form images at differing levels of detail, and partition the characterizations into clusters are also open to choice, as would also be evident to one skilled in the art.

Figure 3:
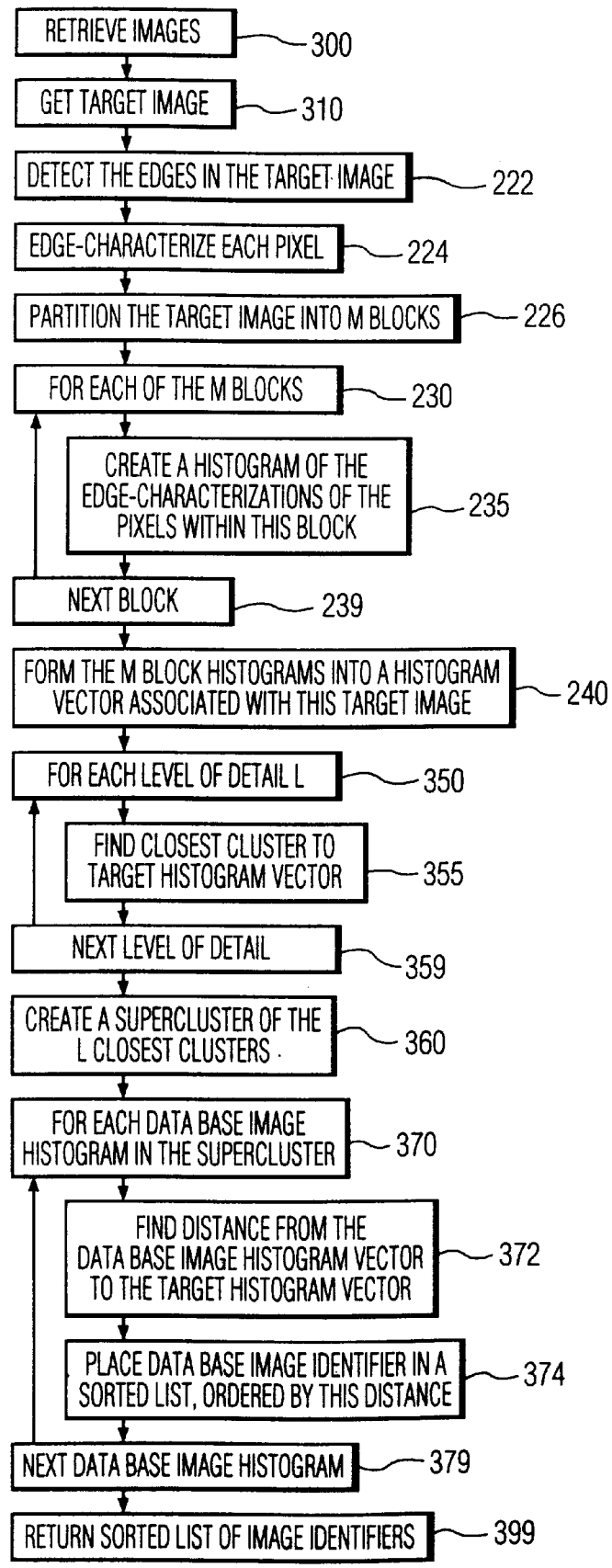
FIG. 3 shows a flowchart for the retrieval of images in accordance with this invention.

FIG. 3 shows a flowchart for retrieving an image from a data base in which the above categorization and characterization of images has been effected. The searcher of images provides a representative target image, at 310. This target image may be a sketch, a drawing, a fully detailed image, etc. The target image is processed in the same manner as the process used to characterize the images in the data base, and the same reference numerals are shown for similar processes in FIGS. 2 and 3. If the target image is a sketch, which is already an abstract image, it is not convoluted into L levels of detail; if it is a detailed image, the same convolution as applied to the data base images are applied, to produce a target image at each level of detail. The edges are identified in the target image 222 and the pixels of the target image are characterized by the identified edges 224 using whatever method was employed in the characterization of the images in the data base. The target image is partitioned into M blocks 226, and a histogram vector is created in the same manner as the histogram vectors of the data base images 230–240.

The closest cluster to the target histogram vector is determined, at each level of detail L, shown by the loop 350 through 359. The L closest clusters are identified and grouped into a supercluster, at 360. Redundancies in this superlcuster are removed, such that a data base image is included in the supercluster only once. Only the histogram vectors within this supercluster will be selected for subsequent searching. The distance between the target histogram vector and each of the data base image histogram vectors is computed, in the loop 370–379. A sorted list is created in this loop, wherein the identifiers of the images are placed in the list in order of ascending distance from the target histogram vector. This ordered list is returned, at 399, for presentation of the images to the user, typically by displaying the first ten closest pictures, then the next 10, etc.

The distance from the target histogram vector to the image histogram vector can be determined in a variety of manners. In the preferred embodiment, the n-dimension Euclidean distance between the blocks of the vectors is utilized; that is, the distance D between blocks is:

$$D = \sqrt{\sum_{j=1}^{N} (T_j - I_j)^2}$$

where N is the number of edge characterizations, $T_j$ is the target histogram entry for the each edge characterization, and $I_j$ is the image histogram entry. In the preferred embodiment, N=4, and the four edge characterizations are horizontal, vertical, left-diagonal, and right-diagonal. The histogram entries are the normalized number of pixels having each characterization. To form a distance between vectors, a composite of the block distances, such as the mean or median of the distances is calculated. The distance to the clusters, above, is determined in the same manner, using the mean of the characterizations of the image vectors within the cluster.

The foregoing merely illustrates the principles of the invention. It will thus be appreciated that those skilled in the art will be able to devise various arrangements which, although not explicitly described or shown herein, embody the principles of the invention and are thus within its spirit and scope.

References:
1. W. Frei and C. C. Chen, *Fast boundary detection: A generalization and a new algorithm*, IEEE Trans. Computers, Vol. C-26, No. 10, pp. 988–998, 1977.
2. M. Abdel-Mottaleb, N. Dimitrova, R. Desai, and J. Martino, *CONIVAS; CONtent-based Image and Video Access System*, ACM Multimedia96, Boston, 1996.
3. M. Flickner et al., *Query by Image and Video Contrast: The QBIC System*, IEEE Computer, 28(9), pp. 23–32, September 1996.
4. K. Hirata and T. Kato, *Query by Visual Example*, Advances in Database Technology EDBT 1992, Third International Conference on Extending Database Technology, Vienna, Austria, Springer-Verlag, 1992.
5. J. Canny, *A Computational Approach to Edge Detection*, IEEE Trans. on Pattern Analysis and Machine Intelligence, Vol. , no. 6, 679–698, November 1986.

We claim:

1. An image retrieval system for retrieving one or more data base images from a data base, said image retrieval system comprising:
   a means for creating a characteristic vector associated with an image,
   said means for creating the characteristic vector comprising:
   a means for detecting edges within the image,
   a means for characterizing the detected edges,
   a means for partitioning the image into a plurality of blocks,
   a means for characterizing the blocks in dependence upon the characterization of the detected edges within each block of the image, and
   wherein said characteristic vector is a composite of the characterizations of the blocks comprising the image, a means for providing each data base image to said characteristic vector creation means to create a data base characterization vector associated with each data base image, a means for providing a target image to said characteristic vector creation means to create a target characterization vector associated with the target image, and a means for selecting one or more of said data base images in dependence upon a comparison of the target characteristic vector with the data base characteristic vector associated with each of said one or more data base images.

2. An image retrieval system for retrieving one or more data base images from a data base, said image retrieval system comprising:

a means for creating a characteristic vector associated with an image, said means for creating the characteristic vector comprising:
  a means for detecting edges within the image, and
  a means for characterizing the detected edges, a means for providing a target image to said characteristic vector creation means to create a target characterization vector associated with the target image, a means for selecting one or more of said data base images in dependence upon a comparison of the target characteristic vector with the data base characteristic vector associated with each of said one or more data base images, a means for creating a set of at least two abstract images associated with each of said one or more data base images, each of the abstract images being at a different level of abstraction, a means for providing each abstract image to said characteristic vector creation means to create a set of abstract characterization vectors associated with each of said one or more data base image, and a means for selecting the one or more data base images dependent upon a comparison of the target characteristic vector with the set of abstract characteristic vectors associated with each of said one or more data base images.

3. An image retrieval system as claimed in claim 1, further comprising:

a means for determining a degree of similarity between characteristic vectors, a means for partitioning the data base images into groups, in dependence upon the degree of similarity among the data base images, and a means for creating a group characteristic vector associated with each group, in dependence upon the data base characteristic vectors associated with the data base images within each group, wherein said means for selecting one or more of said data base images is further dependent upon the degree of similarity between the target characteristic vector and the group characteristic vectors.

4. An image retrieval system as claimed in claim 2, further comprising:

a means for determining a degree of similarity between characteristic vectors, a means for partitioning the data base images into a set of groups, in dependence upon the degree of similarity among the abstract characterization vectors of each set of abstract characterization vectors, and a means for creating a set of group characteristic vectors associated with each group, in dependence upon the abstract characteristic vectors associated with the data base images within each group, wherein said means for selecting one or more of said data base images is further dependent upon the degree of similarity between the target characteristic vector and the set of group characteristic vectors.

5. An image retrieval system as claimed in claim 1, wherein
said means for characterizing the detected edges comprises a means for determining an orientation of each of the detected edges, and
said means for characterizing the blocks comprises a means for creating a histogram of the orientations of each of the detected edges within each block.

6. An image retrieval system as claimed in claim 2, wherein
said means for characterizing the detected edges comprises a means for determining an orientation of each of the detected edges, and
said means for characterizing the blocks comprises a means for creating a histogram of the orientations of each of the detected edges within each block.

7. An image retrieval system as claimed in claim 3, wherein
said means of characterizing the detected edges comprises a means for determining an orientation of each of the detected edges, and
said means for characterizing the blocks comprises a means for creating a histogram of the orientations of each of the detected edges within each block.

8. An image retrieval system as claimed in claim 4, wherein
said means for characterizing the detected edges comprises a means for determining an orientation of each of the detected edges, and
said means for characterizing the blocks comprises a means for creating a histogram of the orientations of each of the detected edges within each block.

9. An image retrieval system as claimed in claim 7, wherein
said means for determining the degree of similarity between characteristic vectors comprises the computation of the Euclidean distance between the characteristic vectors.

10. An image retrieval system as claimed in claim 8, wherein
said means of determining the degree of similarity between characteristics vectors comprises the computation of the Euclidean distance between the characteristic vectors.

11. An image retrieval system as claimed in claim 3, wherein
said means for partitioning the data base images comprises a means for K-means clustering.

12. An image retrieval system as claimed in claim 4, wherein
said means for partitioning the data base images comprises a means for K-means clustering.

13. An image retrieval system as claimed in claim 9, wherein
said means for partitioning the data base images comprises a means for K-means clustering.

14. An image retrieval system as claimed in claim 10, wherein said means for partitioning the data base images comprises a means for K-means clustering.

15. An image retrieval system as claimed in claim 2, wherein
said means for creating each abstract image comprises a means for convoluting the data base image with a Gaussian kernel of a specified width.

16. An image retrieval system as claimed in claim 4, wherein
said means for creating each abstract image comprises a means for convoluting the data base image with a Gaussian kernel of a specified width.

17. An image retrieval system as claimed in claim 6, wherein
said means for creating each abstract image comprises a means for convoluting the data base image with a Gaussian kernel of a specified width.

18. An image retrieval system as claimed in claim 8, wherein
said means for creating each abstract image comprises a means for convoluting the data base image with a Gaussian kernel of a specified width.

19. An image retrieval system as claimed in claim 8, wherein
the set of abstract images associated with each data base image comprise at least two abstract images, each at a different level of abstraction;
each image is partitioned into 256 blocks; and
the orientation of each edge is one of horizontal, vertical, left-diagonal, and right-diagonal.

20. An image retrieval system as claimed in claim 19, wherein
said means for creating each of the at least two abstract images comprise a means for convoluting the data base image with Gaussian kernels of differing widths.

21. A method for image characterization comprising:
creating a characteristic vector associated with an image, said characteristic vector creation comprising: detecting edges within the image, characterizing the detected edges partitioning each image of a plurality of images into a plurality of blocks, detecting edges within each block of the plurality of blocks of each image, characterizing the detected edges within each block to form a characterization of the detected edges within each block,
characterizing each block based on the characterization of the detected edges within each block, and
composing an image characteristic vector corresponding to each image of the plurality of images based on the characterization of edges within each block of the plurality of blocks of each image.

22. The method of claim 21, further including:
partitioning a target image into a plurality of target image blocks,
characterizing each target image block of the plurality of target image blocks based on a characterization of edges within each target image block,
composing a target characteristic vector corresponding to the target image, based on the characterization of edges within each target image block of the plurality of target image blocks to form a target characteristic vector corresponding to the target image, and
comparing the target characteristic vector to the plurality of image characteristic vectors to facilitate an identification of at least one image of the plurality of images that are similar to the target image.

23. The method of claim 21, wherein the step of characterizing each block based on a characterization of edges within each block includes:
determining an orientation of each of the edges, and
creating a histogram of the orientations of each of the edges within each block.

24. The method of claim 21, further including:
creating a set of abstract images associated with each image of the plurality of images, each abstract image of the set of abstract images having a different level of abstraction,
partitioning each abstract image into a plurality of abstract blocks,
characterizing each abstract block of the plurality of abstract blocks of each abstract image of the set of abstract images based on a characterization of edges within each abstract block,
composing an abstract characteristic vector corresponding to each abstract image of the set of abstract images of the plurality of images, based on the characterization of edges within each abstract block of the plurality of abstract blocks of each abstract image to form a set of abstract characteristic vectors corresponding to each image of the plurality of images.

25. The method of claim 24, further including:
forming a plurality of clusters of images based on a first abstract characteristic of the set of abstract characteristic vectors corresponding to each image of the plurality of images, and
composing a plurality of cluster characteristic vectors corresponding to each cluster of the plurality of clusters, based on the first abstract characteristic vector corresponding to each image in each cluster of the plurality of cluster of images.

26. The method of claim 25, further including:
partitioning a target image into a plurality of target image blocks,
characterizing each target image block of the plurality of target image blocks based on a characterization of edges within each target image block,
composing a target characteristic vector corresponding to the target image, based on the characterization of edges within each target image block of the plurality of target image blocks to form a target characteristic vector corresponding to the target image, and
comparing the target characteristic vector to each cluster characteristic vector of the plurality of cluster characteristic vectors to facilitate an identification of at least one cluster of the plurality of clusters containing images that are similar to the target image.

27. A method for image characterization comprising:
detecting edges within each image of a plurality of images, characterizing the detected edges within each image to form a characterization of the detected edges within each image, creating a characteristic vector associated with each image based on the characterization of the detected edges creating a plurality of abstract images associated with each image of the plurality of images, each abstract image of the plurality of abstract images being at a different level of abstraction,
characterizing each abstract image of the plurality of abstract images based on a further characterization of the detected edges within the image to form an abstract characteristic vector corresponding to each different level of abstraction, thereby forming a set of abstract characteristic vectors associated with each image.

* * * * *